United States Patent [19]

Lin et al.

[11] 4,308,889
[45] Jan. 5, 1982

[54] ELECTRIC CONDUCTIVE TYPE STEAM TRAP

[76] Inventors: Jih-Shyan Lin, 6, Hsin-Kun Rd., Tien-Chung, Chung-Hua Hsien; Wuu-Shyong Lin, 28, Chung-Hsi Rd., Lin-Nei County, Yun Lin Hsien; Kwei-Lin Chen; Chen-Jiing Wen, both of 6, Hsin-Kun Rd., Tien Chung, Chang-Hua Hsien, all of Taiwan

[21] Appl. No.: 144,992

[22] Filed: Apr. 30, 1980

[51] Int. Cl.³ ............................................... F16T 1/00
[52] U.S. Cl. .................................................... 137/187
[58] Field of Search ........................ 137/187, 192, 392

[56] References Cited

U.S. PATENT DOCUMENTS 1,603,092 10/1926 Morden ................................ 137/187
3,592,058  7/1971 Benson .................................. 73/204
3,780,261 12/1973 Williams ......................... 137/392 X
3,905,385  9/1975 Green ................................... 137/187

Primary Examiner—Alan Cohan
Attorney, Agent, or Firm—Browdy and Neimark

[57] ABSTRACT

An electric conductive type steam trap comprises a trap body substantially in the construction of a three-way tube connected to the exhausting end of the steam pipe; an electric solenoid provided between an orifice apparatus and the exit of the condensate; and an electric control apparatus. The first end of the trap body is connected to the steam pipe, the second end of the trap body is connected to the orifice apparatus and the third end of the trap body is connected to a condensate level detecting apparatus. The condensate level detecting apparatus will pick up the signal of the level of the generated condensate which will be fed into the electric control apparatus for actuating the electric solenoid to discharge the condensate in the exhausting end of the steam pipe.

3 Claims, 5 Drawing Figures

ELECTRIC CONDUCTIVE TYPE STEAM TRAP

BACKGROUND OF THE INVENTION

1. Field of the Invention

The present invention relates to a steam trap, particularly to a steam trap which is operated by electric conduction of the condensate generated and thus named as electric conductive type steam trap.

2. Brief Description of the Prior Art

In the conventional factories using steam as the heat transferring medium, the high pressure and high temperature steam generated by the steam boiler will condense after heat-exchange. The drain or condensate stored in the end portion of the steam pipes must be discharged properly not to influence the efficiency of heat-exchange and not to discharge live steam. Therefore, several kinds of steam traps have been developed in the past.

The conventional steam traps are mechanical type ones such as thermodynamic steam traps and float steam traps shown in FIGS. 1 and 2. The thermodynamic steam trap is very simple in structure, however, the operation mechanism thereof is not perfectly understood. The flash steam passes the disc 10 in a relatively high speed, and the pressure difference generated by the floating steam will activate the disc 10 to close the exit of the condensate. This kind of thermodynamic steam trap is only available to discharge the condensate of a temperature lower than the steam by 2 to 3 degrees centigrade. Besides, the trap will be out of function if a large amount of gas is introduced into the pipes.

The float steam trap shown in FIG. 2 controls the operation of a valve 21 by the floating mechanism of the floating bulb 20. Therefore, this kind of steam trap is used at the place where pressure or load changes frequently and is able to discharge the condensate of the same temperature as the steam. However, the principal disadvantage of the float steam trap is that it will be easily damaged by water hammering.

Except the disadvantages of the conventional steam traps stated hereinabove, there are still a number of common disadvantages such as: the temperature range of application is limited and so is the pressure range, the frequency for discharging the condensate is rather high causing the high pressure steam in the pipe to leakage and a lot of heat energy lost, the mechanical structure is complicate causing a high maintenance cost, a short life time, etc.

BRIEF SUMMARY OF THE PRESENT INVENTION

It is therefore the principal object of the present invention to provide an electric conductive type steam trap having the advantages of less damages, longer life time, and accuracy in operation.

Another object of the present invention is to provide a steam trap to discharge the condensate by detecting the condensate level and to complete the electric circuit by the extremely low conductivity of the condensate.

Still another object and feature of the present invention is to provide a steam trap comprising an orifice apparatus whereby the aperture thereof may be properly chosen depanding on the load and the pressure of the steam pipes to avoid the happening of flashing. It is therefore the present steam trap may be available to the pipes of different steam pressure.

A further feature of the present invention is to provide an electric control apparatus which amplifies the signal from the condensate-level-detecting apparatus and comprises a number of time delay circuits to control the time interval for starting and ending the discharge of the condensate thus having an optimun discharge frequency.

Still further object of the present invention is to provide an electric solenoid which will control the condensate discharge exit. Because the high pressure and high temperature condensate will flash under atmosphere and become condensate of 100° C. together with flashing steam of atmosphere passing the orifice apparatus, it will be enough by using an electric solenoid having a 100° C. temperature resistance to make the present steam trap available for all the steam pipes of different pressure and temperature. In other words, the temperature and pressure range of application of the present invented steam trap are greatly improved.

Accordingly, the conductive type steam trap of the present invention comprises a trap body, connected to the end portion of the steam pipe with one end thereof connected to the steam pipe and another end connected to an orifice apparatus, and a condensate-level-detecting apparatus to detect the liquid surface of the condensate; an orifice apparatus to control the temperature of condensate passing through the solenoid by flashing to atmosphere at about 100° C. and to keep the level of condensate stable to descend; and electric control apparatus receives the signal from the condensate-level-detecting apparatus, actuating an electric solenoid to discharge the condensate and control the time interval for starting and ending the discharge; and an electric solenoid controlling the condensate discharge exit.

BRIEF DESCRIPTION OF THE DRAWINGS

Those and other objects, features and advantages will become apparent from the following detailed description of the preferred embodiment of the present invention with reference to the accompanying drawings, wherein.

DETAILED DESCRIPTION OF THE PREFERRED EMBODIMENT

Figure 1:
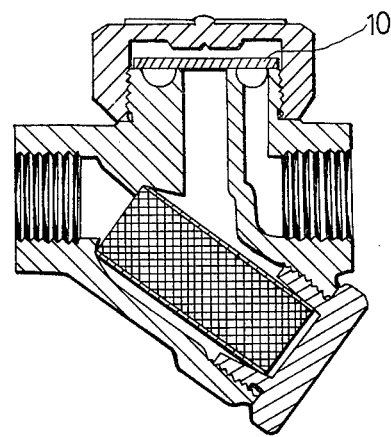
FIG. 1 is a sectional view of a conventional thermodynamic steam trap.
Figure 2:
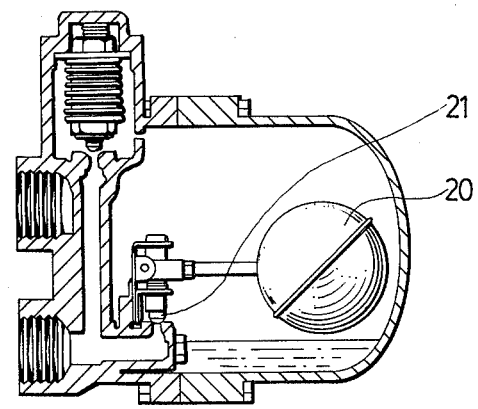
FIG. 2 is a sectional view of a conventional float steam trap.
Figure 3:
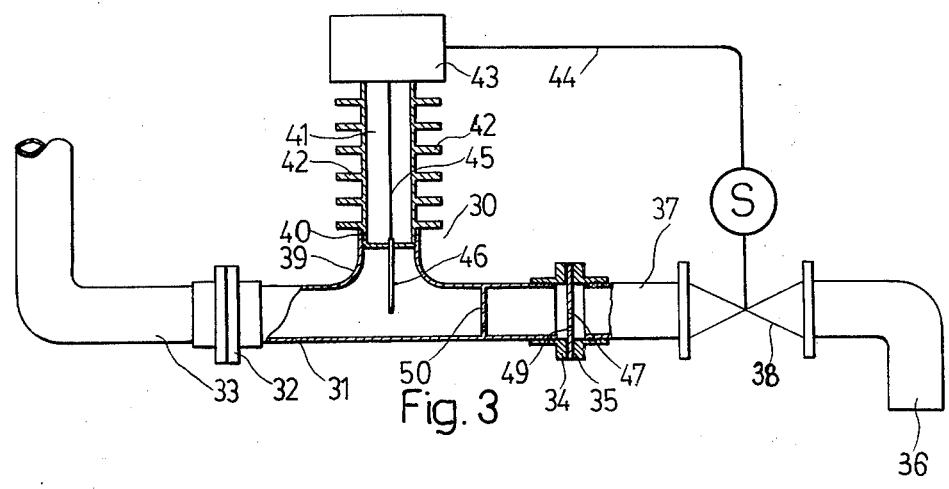
FIG. 3 is an illustrative elevation of the conductive type steam trap in accordance with the present invention.

Referring to FIG. 3 which shows an illustrative elevation of the steam trap of the present invention, the steam trap 30 consists of a trap body 31 with one end thereof connected to the steam pipe 33 by a flange 32, another end thereof connected to an orifice apparatus 35 by another flange 34. An electric solenoid 38 is provided on the condensate discharge pipe 37 for controlling the condensate discharge exit 36. The trap body 31 further has a joint 39 connected to a heat sink pipe 41 by a flange 40. There are a plurality of fins 42 formed on the outer surface of the heat sink pipe 41. The second end of the heat sink pipe 41 is connected to the electric control apparatus 43 which is further connected to the electric solenoid 38 by a lead wire 44 and to the condensate-level-detecting apparatus 46 through a lead wire 45. The condensate-level-detecting apparatus 46 actually may be a liquid surface probe.

The orifice apparatus 35 substantially comprises an orifice plate 47 positioned by a couple of flanges 48 and having an aperture 49 formed thereon. The aperture 49 is best to be positioned near the lowest inner surface of the steam pipe and the diameter of the aperture 49 depends on the inner pressure of the steam pipe.

The operation and its mechanism is described hereinbelow. The steam in the pipes, after heat-exchange, condensates into drain which will be stored in the pipe as well as the trap body 31. The liquid surface of the condensate stored grows when time passes. As soon as the liquid surface of the condensate is detected by the condensate level detecting apparatus 46, the circuit of the electric control apparatus 43 becomes ON and the latter will actuate the electric solenoid 38 to open the condensate discharge exit 36 for discharging the condensate after a certain present time interval. The liquid surface of the condensate in the trap body 31 drops after the condensate is discharged. Once the liquid surface is not in touch with the condensate-level-detecting apparatus 46, the circuit of the electric control apparatus 43 will delay a certain time period and then become OFF. The electric solenoid 38 will be OFF accordingly and the condensate discharge exit 36 closes. Thus a complete cycle of operation is achieved.

There are several detailed points in the operation that will be explained in the following.

1. There is only one lead wire 45 connected to the condensate-level-detecting apparatus 46 which forms the positive terminal of the electric circuit of the electric control apparatus 43. The negative terminal or ground is the trap body 31 itself and the pipe 41. The reference voltage for said circuit is 3 volts or 6 volts.

2. The circuit of the electric control apparatus 43 becomes ON by the conduction of the condensate in the trap body. The condensate has an ion density of 0.1 PPM and a conductivity of 114 $\mu v/cm$ (25° C.). It is therefore the signal detected is large enough to operate the steam trap.

3. The purpose of providing an orifice apparatus 35 is to prevent the high pressure and temperature condensate from flashing in the trap body 31. Only the condensate passing the aperture 49 of the orifice apparatus 35 will flash in the condensate discharge pipe 37. The electric signal might break if the condensate flasher in the trap body. The reason why the aperture 49 of the orifice apparatus 35 is provided near the lower inner surface of the pipe is to facilitate the discharging of the condensate without flashing in the trap body. Because the condensate flashes when it passes the aperture 49 of the orifice apparatus 35 into atmosphere, the temperature of the condensate passing the electric solenoid 38 must be 100° C. or around. The conventional electric solenoid using Teflon material to be the packing or seal can take at least 180° C. temperature without damage. Therefore, the present invented steam trap may be applied to different places of various temperature and pressure.

4. The steam trap of the present invention utilizes the condensate as the electric conduction medium. There is a time delay circuit which can be adjusted to control the condensate discharge time. This circuit will be described hereinbelow.

5. For the convenience of manufacture, the orifice apparatus 35 may be integrally formed with the trap body 31 like that is shown by the orifice plate 50 in FIG. 3.

6. The trap body of the steam trap of the present invention may be positioned horizontally like the way shown in FIG. 3. But actually, it may be positioned vertically at the end portion of the steam pipe.

7. The electric control apparatus 43 may be connected to the trap body 31 by a heat sink pipe 41 or installed in the control room of the factories.

Figure 4:
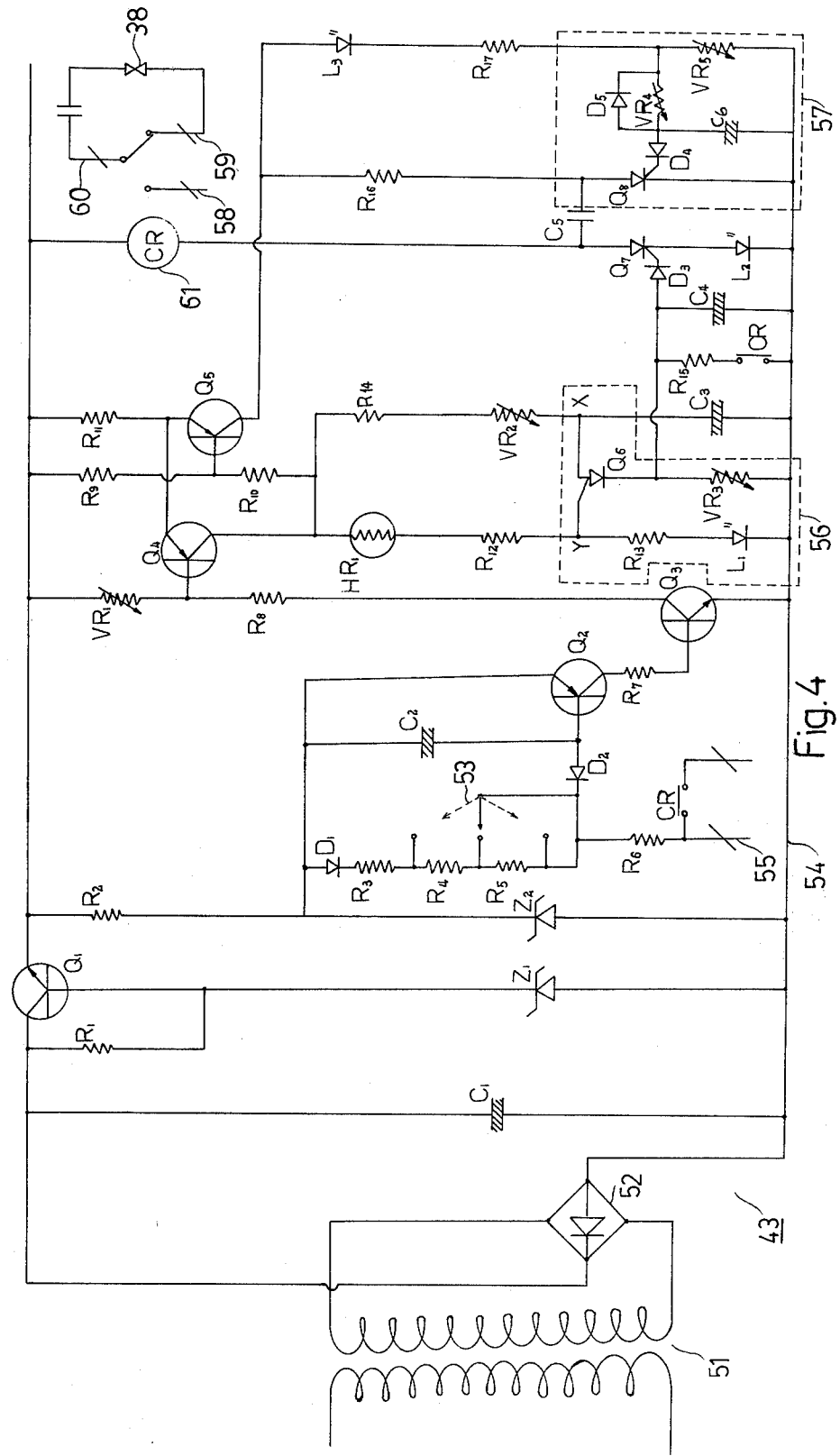
FIG. 4 is a circuit diagram of the embodiment of the electric control apparatus of the steam trap in accordance with the present invention.

Referring to FIG. 4 which shows a circuit diagram of the embodiment of the electric control apparatus in accordance with the present invention, the power supply 51 is rectified by a bridge rectifier 52 and filtered by a capacitor C1. Z1 is a zener diode for stabilizing the voltage at a value of 24 volts. D1 is a temperature compensation diode. 53 represents an ion density selector. 54 is the negative terminal of the condensate level detecting apparatus while the 55, also shown in FIG. 3 as a probe 46, is the positive terminal of the condensate level detecting apparatus. C2 and D2 form a filter for said terminals. Q2 and Q3 are amplifier transistors and Q4 and Q5 form a Schmitt Circuit. HR represents a thermo resistor and 56 represents a pulse generator. Q7 and Q8 are two silicon control rectifiers (SCR) and 57 represents an integrator circuit. A relay 61 has three contacts 58, 59 and 60 for controlling the operation of the electric solenoid 38.

In operation, when the condensate in the trap body 31 touches the probe 46 i.e. the terminals 54 and 55 contact, the signal will be fed to transistors Q2 and Q3 for amplifying. The Schmitt circuit operates with transistor Q4 ON and Q5 OFF thus the pulse generator 56 starts to generate pulse voltage and charge the capacitor C3. Until the potential $V_x$ of point X is greater than the potential $V_y$ of point Y, the silicon control switch (SCS) Q6 is On, capacitor C3 discharges and capacitor C4 charged to trigger the SCR Q7. The electric solenoid 38 will be actuated through the operation of the relay 61 and the condensate starts to discharge. It is to be noted that a certain time interval will delay after the terminals 54 and 55 contact wherein the time interval may be adjusted by a variable resistor VR2.

After the condensate in the trap body 31 discharged and dropped in its level, the terminals 54 and 55 will no longer contact and the Schmitt circuit will become Q4 OFF and Q5 ON. The integrator circuit 57 starts to integrate till the voltage of capacitor C6 is high enough to trigger the SCR Q8. The capacitor C5 will discharge immediately through SCR Q7 make the latter become OFF and thus off the relay 61. The electric solenoid 38 closes and the condensate discharge stops. It is also to be noted that the time interval between discharge stop and the terminals 54, 55 disconnect may be adjusted by a variable resostor VR4.

The above mentioned steam trap is only one embodiment of the present invention particularly suitable for replacing the conventional steam traps in the ordinary factories. In other words, it is very easy to detach the conventional steam traps and replace by one of the present invention.

Figure 5:
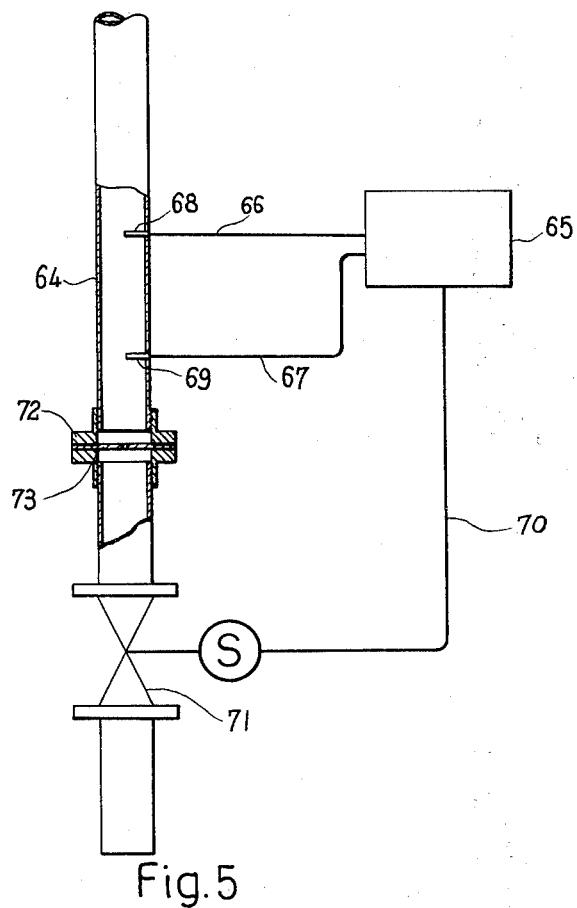
FIG. 5 is an illustrative elevation of another embodiment of the conductive type steam trap in accordance with the present invention.

In a new built factory, it is better to make an In-Line design that is to say use the steam pipe itself as the trap body. This embodiment is shown in FIG. 5 with the trap body installed vertically. The end portion of the steam pipe is used as the trap body 64 having condensate level detecting probes 68, 69 installed therein connected to the electric control apparatus 65 through lead wires 66, 67. The end of the trap body 64 is connected to an orifice apparatus 73 by a flange 72 and there is a lead wire 70 connecting the electric control apparatus 65 to the electric solenoid 71. It is obvious to see that the structure and operation of the embodiment in FIG. 5 is similar to that of the embodiment shown in FIG. 3 except the former has two probes 68 and 69 which are discharging probe 68 and discharge stop probe 69 respectively. The steam trap will operate to discharge the condensate after the condensate level grows and touches the discharging probe 68 and will stop discharging after the condensate level drops below the discharge stop probe 69. The function of the electric control apparatus 65 and the electric solenoid 71 is same to that of the embodiment shown in FIG. 3. The principal advantage of the second embodiment is that by properly adjust the position of the probes 68 and 69, the amount of the condensate to be discharged is controlled. Another object of the second embodiment is to guarantee no steam leakage by the equipment of the discharge stop prob 69. Of course, it may be equipped with the steam trap an alarm apparatus Which will generate an alarm signal when the steam trap is out of function.

Summarily, the electric conductive type steam trap according to the present invention is different to the conventional mechanical steam trap. The trap is accurate in control, less damage, longer life time and widely applied to different temperature and pressure.

The foregoing is considered as illustrative only of the principles of the invention. Further, since numerous modifications and changes will readily occur to those skilled in the art, it is not desired to limit the invention to the exact construction and operation shown and described. And accordingly, all suitable modifications and equivelents may be resulted to falling within the scope of the invention as claimed.

What is claimed is:

1. An electric conductive type steam trap comprising:
    a trap body for containing the condensate with one end thereof connected to the steam pipe and another end thereof connected to the condensate discharge pipe;
    a condensate level detecting apparatus for detecting the level of the condensate in said trap body;
    an electric control apparatus receiving the signal picked up by said condensate level detecting apparatus and to control the ON and OFF of a relay;
    an electric solenoid installed in the condensate discharge pipe, and controlled by said relay to control the discharge of the condensate; and
    an orifice apparatus installed in the steam pipe between the trap body and the electric solenoid, and contributing the flashing of the high pressure and high temperature condensate to atmosphere.

2. A steam trap as claimed in claim 1 wherein said orifice apparatus consists of an orifice plate with an aperture formed thereon; said aperture is best to be positioned near the lower inner surface of the steam pipe.

3. A steam trap as claimed in claim 1 wherein said orffice plate is integrally formed in the trap body.

* * * * *